Patented Nov. 11, 1947

2,430,771

UNITED STATES PATENT OFFICE 2,430,771

ANTHRAQUINONE ACID DYESTUFF

Jean G. Kern, Orchard Park, N. Y., assignor to Allied Chemical & Dye Corporation, New York, N. Y., a corporation of New York No Drawing. Application January 1, 1944, Serial No. 516,727

5 Claims. (Cl. 260—374)

This invention relates to anthraquinone acid dyestuffs. It relates more particularly to dyestuffs which are derivatives of 1,4-diamino-anthraquinone acids, and especially which are derivatives of 1,4-diamino-anthraquinone-2-sulfonic acid, in which a hydrogen atom of the 4-amino group is replaced by an aryl radical.

The dyestuffs of the present invention are derivatives of 1,4-diamino-anthraquinone acids in which an amine radical is present in the 1-position and a hydrogen atom of the 4-amino group is replaced by a biphenyl-sulfonamide radical. They include the free acids and salts thereof. Preferably they contain a carboxyl group or a sulfonic acid group (in the free acid or salt form) in the 2-position of the anthraquinone nucleus.

The 1-position of the anthraquinone nucleus of the dyestuffs may be occupied by an unsubstituted amino radical or by any of a number of substituted amino radicals, all of which are included herein within the generic term "an amine radical." Thus, one or both of the hydrogens of the —NH₂ group in the 1-position may be replaced by an alkyl, aryl, aralkyl, hydroaryl, cycloalkyl, or heterocyclic radical.

In the form of the sodium salts they are blue to green solids, soluble in water, and dyeing animal fibers and nylon from acid and neutral dye baths in level, bright blue to green shades. Their neutral solutions, particularly those containing sodium sulfate or other similar salt, dye animal fibers, nylon and related substances strong, uniform and fast shades of blue to green.. (It will be understood that the term "nylon," as employed herein, includes synthetic fiber-forming linear polyamides, such as are described in United States Patents 2,071,250, 2,071,253, 2,130,523, 2,130,948 and British Patent 495,790, in the form of masses, sheets, rods, fibers, textiles, or otherwise.)

The dyestuffs of the present invention are particularly valuable by virtue of their ability to produce strong and even dyeings on the aforesaid fibers when applied from a neutral dye bath containing sodium sulfate. Hence, in and for dyeing mixed fabrics, e. g., nylon-rayon, nylon-cotton, etc., the new dyestuffs may be employed simultaneously in a single dye bath with direct dyestuffs for rayon or cotton or other dyestuffs which are applicable only from a neutral or slightly alkaline dye bath. The dyestuffs of the present invention, when applied from a neutral dye bath, are also valuable for producing union shades on mixed fabrics composed of nylon and animal or other proteinic fibers (e. g., wool, silk, casein, soybean, etc.).

In the form of the salts of metals other than those of the first group of the periodic table (for example barium, tin, lead, aluminum, calcium, strontium, magnesium, copper, chromium, nickel, etc.), which for convenience are termed "lakes," they are insoluble or difficultly soluble in water; but their aqueous dispersions dye animal fibers and nylon, especially the latter, shades which are usually brighter and clearer than those obtained with the corresponding water-soluble modifications.

The amino-biphenyl-sulfonamide radical in the 4-position of the anthraquinone nucleus may be any of various amino-biphenyl derivatives containing a substituted or unsubstituted sulfonamide radical, including sulfonamide derivatives of amino-biphenyls in which the amino and sulfonamido radicals are attached to the same benzene nucleus or to different benzene nuclei; in which the biphenyl nucleus is or is not further substituted; and in which the hydrogen atoms of the sulfonamide radicals are unsubstituted or are substituted by the same or different alkyl, hydroxy-alkyl, aralkyl, cycloalkyl, hydroaryl, aryl, or heterocyclic radicals, or together are replaced by a radical which, with the amido-nitrogen, forms a heterocyclic radical.

Thus, the dyestuffs of the present invention include compounds which, in the form of the free acids, correspond with the following formula:

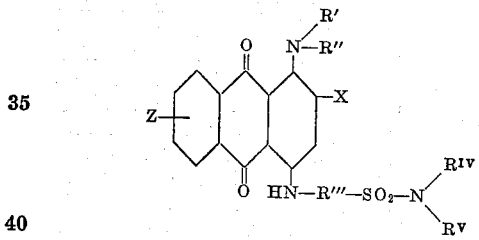

wherein R' is a member selected from the class consisting of hydrogen and alkyl, aralkyl, cycloalkyl, aryl, hydroaryl, and heterocyclic radicals, R'' is a member selected from the class consisting of hydrogen and alkyl, aralkyl, cycloalkyl, aryl, hydroaryl, and heterocyclic radicals, X is a member selected from the class consisting of halogen, the carboxyl group and the sulfonic acid group, Z is a member selected from the class consisting of hydrogen, the carboxyl group and the sulfonic acid group, at least one of X and Z being a carboxyl group or a sulfonic acid group, R''' is a biphenyl radical, R$^{iv}$ is a member selected from the class consisitng of hydrogen, alkyl, hydroxyalkyl, aralkyl, cycloalkyl, hydroaryl, aryl and heterocyclic radicals, and part of a heterocyclic radical of which the nitrogen atom and $R^v$ are also parts, and $R^v$ is a member selected from the class consisting of hydrogen, alkyl, hydroxyalkyl, aralkyl, cycloalkyl, hydroaryl, aryl and heterocyclic radicals, and part of a heterocyclic radical of which the nitrogen atom and $R^{iv}$ are also parts.

Those dyestuffs are of particular importance which contain an —NH2 group in the 1-position of the anthraquinone nucleus, a sulfonic acid group in the 2-position of the anthraquinone nucleus, and an amino-biphenyl-sulfonamide radical in the 4-position of the anthraquinone nucleus.

The dyestuffs of the present invention can be prepared by condensing an amino-biphenyl-sulfonamide with an anthraquinone sulfonic acid (such as an anthraquinone sulfonic acid or an anthraquinone carboxylic acid) having an amine radical in the 1-position of the anthraquinone nucleus and a halogen atom in the 4-position of the anthraquinone nucleus, with the aid of a copper condensation catalyst. The anthraquinone sulfonic acid dyestuffs may also be obtained by condensing an amino-biphenyl-sulfonamide with a dihalogen amino-anthraquinone having an amine radical in the 1-position of the anthraquinone nucleus, a halogen atom in the 4-position of the anthraquinone nucleus, and another halogen atom in another position (preferably the 2-position) of the anthraquinone nucleus, with the aid of a copper condensation catalyst, followed by conversion of the resulting amino-halogen-anthraquinone-amino-biphenyl-sulfonamide to the corresponding sulfonate by treatment with a sulfite or bisulfite.

In the production of the dyestuffs of the present invention, in accordance with the preferred method of procedure, an amino-biphenyl-sulfonamide is reacted with an alkali metal salt of 1-amino-4-brom-anthraquinone-2-sulfonic acid (so-called "bromamine acid"), or an alkali metal salt of 1-amino-4-bromo-anthraquinone-2-carboxylic acid, in an aqueous reaction mixture containing an acid binding agent and a copper catalyst of the type usually employed in condensation reactions of this type, preferably at a temperature of about 70° to about 100° C.

Thus, the reaction may be carried out by heating an aqueous reaction mixture containing the anthraquinone compound and the amino-biphenyl-sulfonamide in about equimolecular amounts (preferably with a slight excess of the amino-biphenyl-sulfonamide), an acid binding agent (such as sodium carbonate, sodium acetate, etc.), and a catalyst (such as powdered copper, cuprous or cupric salts, etc.). The reaction mixture also may contain a water-soluble organic solvent (e. g., methyl or ethyl alcohol, diethylene glycol, dioxan, etc.). After the condensation is completed, the resulting dyestuff is recovered in the form of the free acid by acidifying the reaction mixture, followed by filtration. It is preferably purified by washing with dilute acid or hot saline solution. It may also be purified by repeated dissolution in water and/or alcohol or other suitable solvent and crystallization in the form of the sodium salt.

For the production of the dyestuff "lakes" of the present invention, the dyestuff may be reacted in aqueous solution with a water-soluble salt or other compound of a metal of the type referred to above, and the resulting precipitate recovered by filtration.

The invention will be illustrated by the following specific examples, but it is to be understood that it is not limited to the details thereof and that changes may be made without departing from the scope of the invention. The temperatures are in degrees centigrade and the parts and percentages are by weight.

*Example 1*

A mixture of 10 parts of sodium 1-amino-4-bromo-anthraquinone-2-sulfonate, 6 parts of 4-amino-biphenyl-4'-sulfon-diethylamide, 20 parts of urea, 50 parts of denatured alcohol (U. S. Formula 2B), 150 parts of water, 10 parts of sodium bicarbonate, and 0.5 part of cuprous chloride is heated with agitation to about 75°. The reaction mass is stirred at 75° to 80°, with heating, until no further change in the color is observed when a sample of the reaction mixture is dissolved in water containing 10% of pyridine (a period of about 6 hours). During the first 3 to 4 hours of the heating period, 1 part of cuprous chloride is added to the reaction mixture in about five equal portions at equal intervals. The resulting reaction mixture is diluted with 150 parts of water and filtered. The filter cake is dissolved in 20% aqueous denatured alcohol (2B) and filtered to remove undissolved matter. The resulting filtrate is made strongly acid, by adding hydrochloric acid until a red run-out is obtained when a sample of the filtrate is streaked on filter paper, and filtered. The purification treatment with alcohol and hydrochloric acid is repeated until the filter cake is substantially free from the said red liquor, as evidenced by the absence of a red run-out from a sample of strongly acid (to Congo red paper) filtrate. The filter cake is mixed with about 500 parts of water, and the resulting slurry is heated to 90° and sufficient sodium hydroxide is added to render the resulting mass slightly alkaline to Brilliant Yellow paper. The mass is then cooled to room temperature and salted with common salt to precipitate the dyestuff. The precipitate is filtered and the filter cake is washed with cold water and then dried.

The resulting dyestuff, sodium 1-amino-4-(4'-biphenyl-4''-sulfon-diethylamide) amino-anthraquinone-2-sulfonate, in the form of its free sulfonic acid, corresponds with the formula:

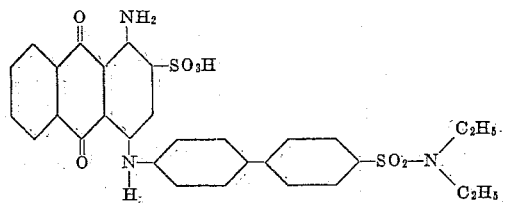

In the form of the sodium salt it dyes wool and nylon fibers, from a neutral bath containing sodium sulfate, strong blue shades which possess excellent brilliance, evenness, and fastness to light and washing.

*Example 2*

Part I.—A mixture of the following substances is heated with stirring to 75°:

| | Parts |
|---|---|
| Sodium 1-amino-4-bromo-anthraquinone-2-sulfonate | 6.4 |
| Denatured alcohol (2B) | 25 |
| Water | 90 |
| 10% aqueous sodium carbonate solution | 50 |
| Cuprous chloride | 0.5 |
| 4-amino-biphenyl-4'-sulfon-diethanolamide | 7 |

It is then agitated at 75° to 85° for about 6 hours to complete the formation of dyestuff, 1 part of cuprous chloride being added thereto in about five equal portions during about the first three hours of this period. When cool, the reaction mass is diluted with about 200 parts of water and filtered.

Part II.—The filtrate is diluted (with water) to three times its volume, is rendered slightly acid to Brom-cresol paper by addition of hydrochloric acid, and the dyestuff is precipitated in the form of an aluminum salt, by adding aluminum formate at 30° to 40°, the amount of aluminum formate added being at least 1 mol, and preferably 2 mols, per 3 mols of dyestuff. The precipitate is separated by filtration.

The aluminum salt of the dyestuff thus prepared is practically insoluble in water, and when dispersed in water (for instance, with the sodium salt of a formaldehyde condensation product of naphthalene sulfonic acid) dyes nylon from a neutral bath intense blue shades which are characterized by excellent uniformity and brilliance, and unusual fastness to light.

In the form of its free sulfonic acid, the dyestuff is represented by the formula:

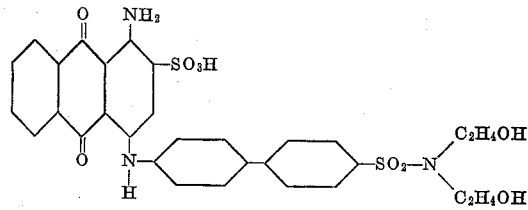

Part III.—For the production of the dyestuff in the form of its sodium salt, the filtrate obtained in Part I, is diluted (with water) to three times its volume, is acidified with hydrochloric acid until a red run-out is obtained when a sample of the filtrate is streaked on filter paper, and then is filtered, the filter-cake is washed free from red liquor in the manner described in Example 1. The filter cake is slurred with 500 parts of water, the resulting slurry is heated almost to boiling, and sufficient sodium carbonate is added to render the mass slightly alkaline to Brilliant Yellow paper. The mass is then cooled to room temperature and salted to precipitate the dyestuff. The precipitate is filtered and the filter cake is washed with a cold 1% aqueous solution of sodium chloride, and dried. The resulting dyestuff, sodium 1-amino-4-(4'-biphenyl-4''-sulfon-diethanolamide) amino-anthraquinone-2-sulfonate, is soluble in a neutral dye bath from which it exhausts well and dyes nylon uniform blue shades which possess good tinctorial strength, brightness, and fastness to light and washing.

Example 3

A mixture of the following substances is heated to 75° with agitation:

| | Parts |
|---|---|
| 4-amino-biphenyl-4'-sulfon-cyclohexyl-amide | 5 |
| Sodium carbonate | 3 |
| Cuprous chloride | 1 |
| "Cellosolve" (ethyleneglycol monoethyl ether) | 75 |
| Water | 150 |
| A commercial surface-active agent comprising a mixture of alkyl benzene sodium sulfonates derived from kerosene (to promote the wetting out and dispersion of the solid reactants) | 0.3 |
| 2-ethyl-1-hexanol (to inhibit foaming) | 0.2 |

Five parts of sodium 1-amino-4-bromo-anthraquinone-2-sulfonate are stirred into the hot (75°) mass during 15 minutes, after which the mass is heated with stirring at 75° to 80° for about 6 hours, to complete the formation of the dyestuff. (By adding a small amount (e. g., 0.4 part) of powdered copper to the reaction mass, the condensation can be accelerated.) The reaction mass is rendered acid to Congo red paper by addition of dilute hydrochloric acid, and the resulting precipitate of the crude dyestuff in the form of the sulfonic acid is filtered off and purified in a manner analogous to that described in Example 1. The purified filter cake is agitated with 500 parts of water, the resulting thin slurry is heated to 90° to 100° and sufficient sodium carbonate is added to render the mass slightly alkaline to Brilliant Yellow paper. The mass is then cooled to room temperature and salted with common salt to precipitate the dyestuff. The precipitate is filtered and the filter cake is washed with a cold 1% aqueous solution of sodium chloride, and dried.

In the form of the free sulfonic acid, the dyestuff corresponds with the formula:

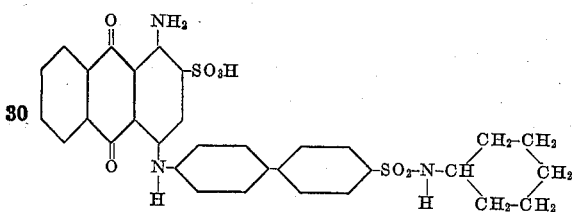

In the form of the sodium salt it dyes nylon from a neutral bath clear blue shades which possess outstanding intensity and fastness to light.

Example 4

A mixture of 40 parts of 1-amino-4-bromo-anthraquinone-2-carboxylic acid, 60 parts of 4-aminobiphenyl-4'-sulfon-diethyl-amide, 30 parts of soda ash, 4 parts of copper sulfate, 2 parts of cuprous chloride, and 500 parts of water is heated to 90° to 95° until foaming subsides (about 1 hour), and is then refluxed for about 4 hours to complete the condensation. After cooling to room temperature, the reaction mass is filtered. The filter cake is washed with a cold 5% aqueous solution of sodium chloride, and then stirred into a mixture of 1000 parts of water and 175 parts of 20° Bé. hydrochloric acid. The resulting suspension is heated to 90° to 95°, agitated at that temperature for 1 hour, and filtered hot, and the filter cake is washed free from acid with hot water. The cake of crude dyestuff thus obtained is slurried with 3000 parts of hot water, and the mixture is rendered alkaline to Brilliant Yellow paper with soda ash. The mass is then filtered at 85°, and the filter cake is washed with hot water until a colorless filtrate is obtained. The combined filtrates are cooled to room temperature and salted with common salt to precipitate the dyestuff, which is separated by filtration, washed with cold water and dried.

The resulting product, the sodium salt of 1-amino-4-(4'-biphenyl-4''-sulfon-diethylamide)-amino-anthraquinone-2-carboxylic acid, is a blue, crystalline solid, which is somewhat less soluble in hot and cold water, but exhausts more completely from a neutral dye bath, than the corresponding sulfonate dyestuff of Example 1. It dyes nylon from a neutral dye bath blue shades, which possess good strength, evenness and fastness properties, and are brighter than dyeings, similarly obtained with the dyestuff of Example 1. In the form of the free carboxylic acid, the dyestuff is represented by the formula:

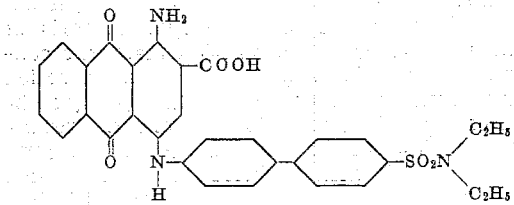

It will be realized by those skilled in the art that the invention is not limited to the details of the foregoing examples and that changes can be made without departing from the scope of the invention.

Thus, instead of the "bromamine acid" and 1-amino-4-bromo-anthraquinone-2-carboxylic acid employed in the above examples, other anthraquinone-sulfonic and carboxylic acids, or mixtures thereof, having an amino radical in the 1-position and a halogen atom in the 4-position may be employed; for example:

1-amino-4-chloro-anthraquinone-2-carboxylic acid
1-amino-4-chloro-anthraquinone-2-sulfonic acid
1-methylamino-4-bromo-anthraquinone-2-sulfonic acid
1-methylamino-4-bromo-anthraquinone-2-carboxylic acid
1-dimethylamino-4-bromo-anthraquinone-2-sulfonic acid
1-ethylamino-4-bromo-anthraquinone-2-sulfonic acid
1-benzylamino-4-bromo-anthraquinone-2-sulfonic acid
1-phenylamino-4-bromo-anthraquinone-2-sulfonic acid
1-cyclohexylamino-4-bromo-anthraquinone-2-sulfonic acid
1-alpha-furfurylamino-4-bromo-anthraquinone-2-sulfonic acid
1-amino-2,4-dibromo-anthraquinone-5-sulfonic acid
1-amino-2,4-dibromo-anthraquinone-6-sulfonic acid
1-amino-2,4-dibromo-anthraquinone-7-sulfonic acid
1-amino-2,4-dibromo-anthraquinone-8-sulfonic acid
1-amino-4-bromo-anthraquinone-2,5-disulfonic acid
1-amino-4-bromo-anthraquinone-2,6-disulfonic acid
1-amino-4-bromo-anthraquinone-2,7-disulfonic acid
1-amino-4-bromo-anthraquinone-2,8-disulfonic acid.

Further, instead of the amino-biphenyl-sulfonamides employed in the above examples or the modifications thereof referred to above, other amino-biphenyl-sulfonamides may be employed, for example:

4-amino-biphenyl-4'-sulfonamide

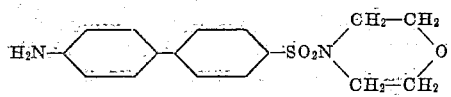

4 - amino-biphenyl-3-sulfondi(2'-hydroxy-ethyl)-amide

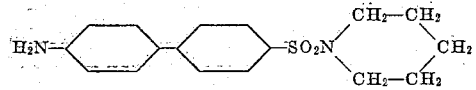

4-amino-biphenyl-4'-sulfondimethylamide

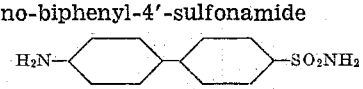

4-amino-biphenyl-4'-sulfon-n-butylamide

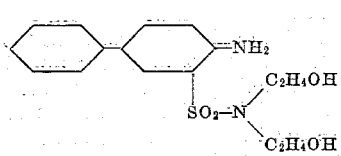

4-amino-biphenyl-4'-sulfonanilide

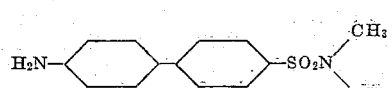

4-amino-biphenyl-4'-sulfondi(n-butyl)amide

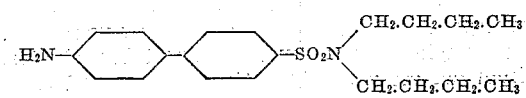

4-amino-biphenyl-4'-sulfonmorpholide

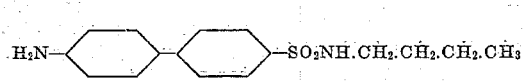

4-amino-biphenyl-4'-sulfonpiperidide

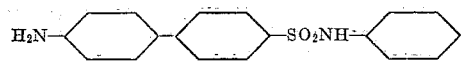

While the condensation is preferably carried out at temperatures of about 70° to about 100° C., and especially at temperatures of 75° to 85° C., other temperatures may be used; for example, temperatures between 60° and 115° C.

The dyestuffs of the present invention may be employed in conjunction with diluents and assistants (such as, dextrine, sugars, sodium chloride, sodium hexametaphosphate), dispersing agents (e. g., higher alkyl aryl sulfonates, diaryl-methane sulfonates, etc.), and they may be marketed in the form of powdered compositions comprising mixtures of said dyestuffs with diluents and/or assistants and/or dispersing agents.

The sodium salts of those dyestuffs of the present invention which contain only one water solubilizing group (namely, a carboxyl group or a sulfonic acid group) in the molecule are particularly suited for dyeing nylon from a neutral dye bath, but they are difficultly soluble in cold water and only moderately soluble in hot water and hot dye baths. Their dissolution or dispersion in cold and hot water can be improved and dyeing facilitated by adding a small amount (1% to 5%, or more, based on the weight of the dyestuff) of a dispersing agent (e. g., a formaldehyde condensation product of naphthalene sulfonic acid, a mixture of alkyl benzene sodium sulfonates derived from kerosene, etc.) to such dyestuffs (as well as other dyestuffs of this invention).

I claim:

1. An anthraquinone acid dyestuff which in the free acid form corresponds with the formula:

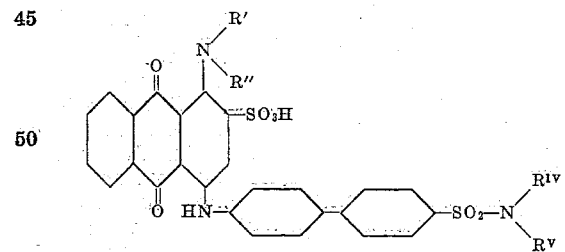

wherein R' and R'' are each a member of the class consisting of hydrogen and the methyl and ethyl radicals; and $R^{iv}$ and $R^v$ are each a member of the class consisting of hydrogen and alkyl and hydroxy-alkyl radicals having a maximum of four carbon atoms per radical, said dyestuff being, in the form of the sodium salt, a blue to green solid which is soluble in water and dyes animal fibers and nylon from acid and neutral dye baths in level, bright blue to green shades.

2. An anthraquinone acid dyestuff which in the free acid form is 1-amino-4-(4'-biphenyl)amino-anthraquinone-2-sulfonic acid having as sole substituent a sulfon-alkylamide radical having a maximum of four carbon atoms per alkyl group, in the biphenyl nucleus, said dyestuff being, in the form of the sodium salt, a blue solid which is soluble in water and dyes animal fibers and nylon from acid and neutral dye baths in level, bright blue shades.

3. An anthraquinone acid dyestuff which in the free acid form corresponds with the formula:

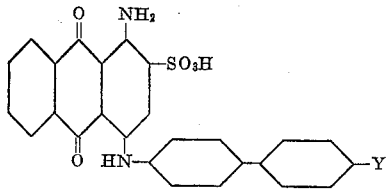

wherein Y is a sulfon-dialkylamide radical having a maximum of four carbon atoms in each alkyl group, said dyestuff being, in the form of the sodium salt, a blue solid which is soluble in water and dyes animal fibers and nylon from acid and neutral dye baths in level, bright blue shades.

4. An anthraquinone acid dyestuff which in the free acid form is 1-amino-4-(4'-biphenyl-4''-sulfon-diethylamide)amino-anthraquinone-2-sulfonic acid, said dyestuff being, in the form of the sodium salt, a blue solid which is soluble in water and dyes animal fibers and nylon from acid and neutral dye baths in level, bright blue shades.

5. An anthraquinone acid dyestuff which in the free acid form is 1-amino-4-(4'-biphenyl-4''-sulfon-diethanolamide)amino-anthraquinone-2-sulfonic acid, said dyestuff being, in the form of the sodium salt, a blue solid which is soluble in water and dyes animal fibers and nylon from acid and neutral dye baths in level, bright blue shades.

JEAN G. KERN.

REFERENCES CITED

The following references are of record in the file of this patent:

UNITED STATES PATENTS

| Number | Name | Date |
|---|---|---|
| 1,871,852 | Kalischer et al. | Aug. 16, 1932 |
| 1,987,538 | Peter | Jan. 8, 1935 |
| 2,029,239 | Kranzlein | Jan. 28, 1936 |
| 2,029,258 | Diefenbach | Jan. 28, 1936 |